United States Patent [19]

Bertrand

[11] 4,359,538

[45] Nov. 16, 1982

[54] FIRE-RETARDANT POLYSTYRENIC COMPOSITIONS

[75] Inventor: Jean-Noel Marie Bertrand, Wezembeek-Oppem, Belgium

[73] Assignee: Labofina, S.A., Brussels, Belgium

[21] Appl. No.: 255,812

[22] Filed: Apr. 20, 1981

Related U.S. Application Data

[62] Division of Ser. No. 22,257, Mar. 20, 1979, abandoned.

[51] Int. Cl.$^3$ .......................... C08K 5/02; C08K 5/17; C08K 5/19; C08K 5/20
[52] U.S. Cl. .......................... 521/79; 521/88; 521/94; 521/98; 521/907; 524/99; 524/156; 524/227; 524/236; 524/237; 524/469; 524/470; 524/371
[58] Field of Search ............... 260/45.9 NC, 45.9 R, 260/45.8 N; 521/907, 94; 524/99, 227, 228, 229, 236, 237, 251

[56] References Cited

U.S. PATENT DOCUMENTS

| | | | |
|---|---|---|---|
| 2,132,388 | 10/1938 | Berchet | 260/404 |
| 2,464,855 | 3/1949 | Duggan et al. | 260/32.6 |
| 2,579,375 | 12/1951 | Eisen | 260/32.4 |
| 2,729,860 | 1/1956 | Balkin et al. | 19/143 |
| 2,770,609 | 11/1956 | Symonds, Jr. | 260/32.6 |
| 3,025,257 | 3/1962 | Coler et al. | 260/32.6 |
| 3,145,187 | 8/1964 | Hankey et al. | 260/23 |
| 3,150,120 | 9/1964 | Perrins | 260/87.1 |
| 3,223,664 | 12/1965 | Conlon | 260/29.1 |
| 3,258,445 | 6/1966 | Schwander et al. | 260/32.6 |
| 3,386,841 | 6/1968 | Braun et al. | 106/165 |
| 3,445,396 | 6/1969 | Funatsu | 260/92.8 |
| 3,457,204 | 7/1969 | Burger | 260/2.5 |
| 3,783,146 | 1/1974 | Savides et al. | 260/45.9 |
| 3,817,879 | 7/1974 | Speyer et al. | 260/2.5 |
| 3,979,545 | 9/1976 | Braus et al. | 428/392 |
| 4,092,281 | 6/1978 | Bertrand | 260/23 |
| 4,144,225 | 3/1979 | Yamanaka et al. | 260/45.9 |
| 4,192,922 | 3/1980 | Mixich et al. | 521/907 |

FOREIGN PATENT DOCUMENTS

817625 7/1974 Belgium .
1089810 6/1965 United Kingdom .

*Primary Examiner*—John Kight, III
*Assistant Examiner*—R. A. White

[57] ABSTRACT

Disclosed is a self-extinguishing polystyrenic composition comprising a polystyrenic resin, a fire-retardant amount of a halogenated organic fire-retardant agent and a nitrogen-containing organic compound selected from the group consisting of amines, amides and ammonium compounds containing from 20 to 40 carbon atoms and their mixtures, said nitrogen-containing compound being used in an amount varying between 0.5 and 50% based on the weight of fire-retardant agent.

20 Claims, No Drawings

FIRE-RETARDANT POLYSTYRENIC COMPOSITIONS

This is a division of application Ser. No. 022,257, filed Mar. 20, 1979, now abandoned.

BACKGROUND OF THE INVENTION

This invention relates to fire-retardant polystyrenic compositions.

For many uses, fire-retardant agents must be incorporated into polystyrenic resins, such as polystyrene, styrene-acrylonitrile copolymers (known as SAN resins), acrylonitrile-butadiene-styrene copolymers (known as ABS resins), high impact polystyrenes and the like, to impart fire-resistance to such resins. Organic compounds containing bromine and/or chlorine are frequently employed as fire-retardant agents. However, large amounts of fire-retardant agents are often required to obtain polystyrenic compositions which fulfill specifications relating to flame propagation; and these large amounts are detrimental for other properties of the polystyrenic compositions, such as tensile strength and thermal stability.

With a view toward decreasing the amount of fire-retardant agent which must be added to such resins, the synergistic action of some additives (or synergistic compounds) which, when used alone, do not act as fire-retardant agents, has been contemplated. Organic peroxides have been suggested as synergistic compounds, but they have several drawbacks, more particularly with respect to toxicity and stability.

U.S. Pat. No. 4,092,281 to the above-named inventor discloses certain nitrogen-containing synergistic compounds for use in fire-retardant polystyrenic compositions. The present invention represents an improvement thereover.

SUMMARY OF THE INVENTION

It is therefore an object of the present invention to provide new and improved fire-retardant styrenic polymer compositions.

Another object of the present invention is to provide new fire-retardant polystyrenic compositions comprising a polystyrenic resin, a halogenated organic fire-retardant agent and a new synergistic compound.

A further object of the present invention is to provide polystyrenic compositions which obviate the above-mentioned drawbacks.

Still another object of the invention resides in providing new synergistic compounds which are very active.

In accomplishing these objects, there has been provided according to one embodiment of the present invention, a polystyrenic composition comprising a polystyrenic polymer, a halogenated organic fire-retardant agent and a nitrogen-containing organic compound selected from the group consisting of amines, amides and ammonium compounds containing from 20 to 40 carbon atoms and their mixtures, said nitrogen-containing organic compound being used in an amount varying between 0.5 and 50% based on the weight of fire-retardant agent.

In another embodiment, the present invention provides a fire-retardant composition for use in combination with polystyrenic resins, said composition containing halogenated organic fire-retardant agent and a nitrogen-containing organic compound as hereinabove specified.

DETAILED DESCRIPTION OF PREFERRED EMBODIMENTS

"Polystyrenic resins" include not only styrene homopolymers, such as crystal polystyrene, but also styrene-based copolymers containing a major amount of styrene, such as ABS resins, SAN resins and high-impact polystyrenes containing an elastomer, such as rubber, in an amount which may reach as much as about 15% by weight. The invention applies also to expanded polystyrene, which may be produced either by molding expandable beads of polystyrene or by extruding mixtures of polystyrene and a blowing agent. It has been found that expanded polystyrene produced by extruding polystyrenic resins in the presence of a blowing agent together with a nitrogen-containing compound of the present invention have cells the average size of which is substantially lower when compared with similar expanded polystyrenes produced in the absence of such a nitrogen-containing compound. For instance, the size of the cells of an expanded polystyrene produced in the presence of an ammonium compound of the present invention varies between about 80 to 100 microns, whereas the size of the cells is about 200 microns when the ammonium compound is not used. As a result, the expanded polystyrenes prepared from the compositions of the present invention have a lower density and improved self-extinguishing properties, and they are therefore particularly advantageous for many uses.

The flame-retardant agent is a halogenated organic compound, more particularly a brominated and/or chlorinated organic compound. These halogenated compounds are generally used in an amount such that the halogen-content in the polystyrenic composition is at least about 0.2%. Contents higher than about 15% do not bring any advantage. More generally, the halogen-content in the final polystyrenic composition lies between about 0.5 and 10% by weight. This amount depends mainly on the kind of halogenated fire-retardant agent; brominated compounds are generally more active than the corresponding chlorinated compounds and they may therefore be used in lower amounts. These agents and their use are well known in the art. Typical halogenated fire-retardant agents are acetylene tetrabromide, dibromotetrachloroethane, tetrachloroethane, pentachloroethane, hexachloro- or hexabromobenzene, tetrabromobutane, polyhalobiphenyls, polyhalobiphenylethers, perhalopentacyclododecanes, pentabromomonochlorocyclohexane, solid and liquid chlorinated paraffins and the like and mixtures thereof.

The nitrogen-containing organic compounds of this invention are synergistic compounds for the halogenated organic compounds which are used as fire-retardant agents for polystrenic resins. These nitrogen-containing compounds are amines, amides or ammonium compounds containing from about 20 to about 40 carbon atoms and preferably from 26 to 40 carbon atoms. They are very active synergistic compounds and they are generally used in an amount which may vary between about 0.5% and about 50%, based on the weight of fire-retardant agent. This amount depends on the type of fire-retardant agent and on the type of nitrogen-containing compound. Generally, the synergistic compound may be used in an amount comprised between about 0.02 and 2% by weight of polystyrenic resin.

The choice of the nitrogen-containing organic compound depends mainly on its price and its availability.

Particularly advantageous nitrogen-containing compounds are:
(a) secondary and tertiary amines having the general formula $N(R_1)(R_2)(R_3)$, wherein $R_1$ is H or an alkyl radical containing from 9 to 18 carbon atoms and $R_2$ and $R_3$, which may or may not be the same, are each an alkyl radical containing from 9 to 18 carbon atoms;
(b) fatty acid amides containing more than 25 carbon atoms, more particularly, alkylene-bis-amides, preferably lower alkylene-bis-amides and most preferably alkylene-bis-amides wherein the alkylene group contains 1 to 5 carbon atoms, such as ethylene-bis-stearylamide and similar;
(c) ammonium compounds, such as
($c_i$) alkylpyridinium bromides of the formula

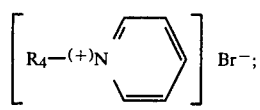

wherein $R_4$ is an alkyl radical containing at least 15 carbon atoms, or
($c_{ii}$) ammonium compounds of the general formula

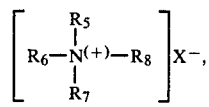

wherein X is Cl, Br or alkylsulfate and the radicals $R_5$ to $R_8$ are H or radicals containing from 1 to 18 carbon atoms, the total of the carbon atoms of the ammonium compound being at least 20. By way of example, there may be mentioned the following preferred ammonium compounds wherein:
1. $R_5$ and $R_7$ are methyl radicals; $R_6$ is an alkyl radical containing at least 9 carbon atoms, such as lauryl or stearyl; $R_8$ is the same as $R_6$ or is a benzyl radical; and X is Cl or Br;
2. $R_5$ and $R_7$ are methyl radicals; $R_6$ is a dialkyl-phenoxyethoxyethyl radical, preferably diisobutyl-phenoxyethoxyethyl; $R_8$ is a benzyl radical; and X is Cl or Br;
3. $R_5$ and $R_7$ are methyl radicals; $R_6$ is an alkyl radical containing at least 4 carbon atoms, such as butyl or hexyl; $R_8$ is H; and X is an alkylsulfate group wherein the alkyl radical contains at least 12 carbon atoms; such as lauryl or stearyl.

The nitrogen-containing organic compounds of the present invention may be incorporated into the resin by intimately mixing the polystyrenic resin, the fire-retardant agent, the nitrogen-containing compound and optionally other usual additives, such as dyes, lubricants and the like. The nitrogen-containing compound may also be added to the styrene monomer or monomer and/or polymer mixture before polymerization.

Some fire-retardant agents, more particularly the agents which possess a high thermal stability, are advantageously used in admixture with antimony oxide. It has been found that the amount of antimony oxide to be added may be decreased by about 50% below that conventionally employed without detrimental effect on the fire-retardant properties or on the thermal stability of the final polystyrenic composition when a nitrogen-containing compound is incorporated as a synergistic compound into the composition. The amount of antimony oxide, when used, does not generally exceed 7% by weight of polystyrenic resin. This amount depends on the kind and amount of fire-retardant agent, and it may vary generally between about 2 and 5%. With other fire-retardant agents, more particularly with halogenated aliphatic compounds, the use of antimony oxide is not required.

The following examples are provided to illustrate the features of the present invention, without in any way limiting the invention.

The self-extinguishing properties of the polystyrenic compositions are determined with the use of specimens measuring $12.70 \times 1.27 \times 0.32$ cm, according to the following test:

Each specimen is hung, the larger dimension being vertical and the distance between the lower end of the specimen and the upper end of the burner being 0.95 cm. The burner is lighted and the flame has a height of 1.9 cm. Air is premixed with the gas in order to avoid any yellow tip at the top of the flame. This flame is disposed under the lower end of the specimen for a period of 10 seconds. The burner is then removed and the flaming combustion time is measured. Immediately after extinction, the flame is again disposed under the specimen for a period of 10 seconds. The burner is then removed, and the flaming combustion time is again measured. The data given in the examples are the average of 20 successive tests (10 specimens and 2 determinations for each specimen). In the case of foamed polystyrene, the same procedure is used, except the flame is disposed under the specimen only 1 time and for a period of 3 seconds.

Unless otherwise expressed, the weight percentages are based on the weight of total composition.

EXAMPLE 1

Compositions are prepared from crystal polystyrene, 0.75% pentabromomonochlorocyclohexane, 0.05% di-tert-butylhydroxytoluene (BHT), 0.035% zinc stearate and 0.20% of the following synergistic compounds.

The self-extinguishing times are as follows:

| Synergistic compound | Flaming combustion time (in seconds) |
| --- | --- |
| Stearyl-dimethyl-benzyl ammonium chloride | 0.42 |
| Distearyl dimethyl ammonium chloride | 0.44 |
| Dilauryl dimethyl ammonium bromide | 0.23 |
| Diisobutyl-phenoxy-ethoxy-ethyl-dimethylbenzyl ammonium chloride monohydrate | 0.51 |
| Cetylpyridinium bromide | 2.07 |
| Ethylene-bis-stearylamide | 0.87 |
| Distearylamine | 0.54 |
| Trilaurylamine | 0.80 |
| Hexyl-dimethyl-ammonium stearylsulfate | 0.44 |

A similar composition but without any synergistic compound has a flaming combustion time of 11.71 seconds.

EXAMPLE 2A

Compositions are prepared from crystal polystyrene, 0.05% BHT, 0.035% zinc stearate, and a fire-retardant agent (for the type and amount, see the following table), dilauryl-dimethyl-ammonium chloride as the synergistic compound (for the amount, see the following table):

| Fire-retardant agent | Amount of $Sb_2O_3$ (%) | Amount of synergistic cmpd. (%) | Flaming combustion time (in seconds) |
| --- | --- | --- | --- |
| Acetylene tetrabromide (0.75%) | 0 | 0.20 | 0.49 |
| Dibromotetrachloroethane (0.75%) | 0 | 0.20 | 1.24 |
| Pentachloroethane (0.75%) | 0 | 0.10 | 9.17 |
| Tetrabromobutene (0.75%) | 0 | 0.05 | 1.58 |

EXAMPLE 2B

Compositions are prepared from high impact polystyrene (containing 6% rubber), 0.05% BHT, 0.035% zinc stearate, and a fire-retardant agent (for the type and amount, see the following table), dilauryl-dimethyl-ammonium chloride as the synergistic compound (for the amount, see the following table), and antimony oxide $Sb_2O_3$ (for the amount, see the following table):

| Fire-retardant agent | Amount of $Sb_2O_3$ (%) | Amount of synergistic cmpd. (%) | Flaming combustion time (in seconds) |
| --- | --- | --- | --- |
| Hexabromobenzene (10%) | 3 | 0.05 | 1.24 |
| Polybromo biphenyl-ether (10%) | 3 | 2.00 | 0.97 |
| Perchloropentacyclododecane (15%) | 3 | 2.00 | 1.12 |
| Perchloropentacyclododecane (10%) | 3 | 2.00 | 3.17 |

EXAMPLE 3

Polystyrene is prepared by suspension polymerization of styrene in the presence of pentabromomonochlorocyclohexane (1%) and distearyl-dimethyl-ammonium chloride (0.15%). The beads of polystyrene are washed with water and then kept under vacuum at 75° C. for one night.

The flaming combustion time of specimens produced from this polystyrene is 0.46 seconds.

EXAMPLE 4

A composition is prepared from high-impact polystyrene (containing 5% of rubber), 10% decabromobiphenyl, 3% $Sb_2O_3$ and 0.5% trilaurylamine.

The flaming combustion time is 1.10 seconds.

A similar composition but without the fatty amine has a flaming combustion time of 2.18 seconds.

EXAMPLE 5

Specimens of expanded polystyrene are prepared by injection molding expandable beads of polystyrene (containing pentane as the blowing agent). Pentabromomonochlorocyclohexane (1.5%) and dilauryl-dimethyl ammonium chloride (0.2%) are added to these beads.

The flaming combustion time is 0.70 seconds (as compared with 3.21 seconds in the absence of the ammonium compound).

EXAMPLE 6

Specimens of expanded polystyrene are prepared by extruding polystyrene in the presence of a blowing mixture (containing equal weights of $CF_2Cl_2$ and $CFCl_3$), 3% pentabromomonochlorocyclohexane and 0.1% distearyl-dimethyl ammonium chloride.

The flaming combustion time is 1.10 seconds. The cells of the expanded polystyrene have an average size of 80 microns, and the density of the final product is 35 kg/m³.

A similar product but prepared without the ammonium compound has the following properties:

| flaming combustion time: | 4.38 seconds |
| --- | --- |
| cell size: | 200 microns |
| density: | 39 kg/m³. |

EXAMPLE 7

A composition is prepared from crystal polystyrene, 5% chlorinated paraffin (average of 25 carbon atoms and chlorine-content=70%), 0.1% BHT, 0.035% zinc stearate and 0.2% distearyl-dimethyl-ammonium chloride.

The flaming combustion time is 10.6 seconds.

A similar composition but without ammonium compound has a flaming combustion time higher than 60 seconds.

EXAMPLE 8

A composition is prepared from ABS resin (containing 7% butadiene and 17% acrylonitrile), 12% decabromodiphenyloxide, 5% $Sb_2O_3$ and 2% distearyl-dimethyl-ammonium chloride.

The flaming combustion time is 1.17 seconds.

A similar composition but without ammonium compound has a flaming combustion time of 3.48 seconds.

What is claimed is:

1. A self-extinguishing expanded polystyrenic composition comprising a homogeneous combination of an expanded polystyrenic resin, a fire-retardant amount of a halogenated organic fire-retardant agent and a nitrogen-containing organic compound containing from about 20 to 40 carbon atoms and being selected from the group consisting of
   (a) a secondary or tertiary amine having the formula $N(R_1)(R_2)(R_3)$, wherein $R_1$ is H or an alkyl radical containing from 9 to 18 carbon atoms and $R_2$ and $R_3$, which may or may not be the same, are each an alkyl radical containing from 9 to 18 carbon atoms;
   (b) an alkylene-bis-fatty acid amide containing at least 26 carbon atoms wherein the alkylene group contains 1 to 5 carbon atoms;
   (c) an ammonium compound selected from the group consisting of
   ($c_i$) an alkylpyridinium bromide of the formula $$\left[ R_4-^{(+)}N \bigcirc \right] Br^{(-)}$$

wherein $R_4$ is an alkyl radical containing at least 15 carbon atoms, or
   ($c_{ii}$) an ammonium compound of the formula

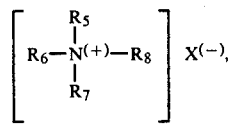

wherein

1. $R_5$ and $R_7$ are methyl radicals, $R_6$ is an alkyl radical containing at least 9 carbon atoms, $R_8$ is the same as $R_6$ or is a benzyl radical; and X is Cl or Br; or
2. $R_5$ and $R_7$ are methyl radicals, $R_6$ is a dialkyl-phenoxy-ethoxyethyl radical; $R_8$ is a benzyl radical; and X is Cl or Br; or
3. $R_5$ and $R_7$ are methyl radicals, $R_6$ is an alkyl radical containing at least 4 carbon atoms, $R_8$ is H and X is an alkylsulfate group wherein the alkyl radical contains at least 12 carbon atoms, or (d) a mixture thereof said nitrogen-containing compound being present in an amount between about 0.5 and 50% based on the weight of the fire-retardant agent, said expanded polystyrene having cells, the average size of which is substantially less than the average cell size of a similar expanded polystyrene produced in the absence of such a nitrogen-containing organic compound.

2. The composition of claim 1, wherein said nitrogen-containing compound is used in an amount between about 0.01 and 5% by weight of the polystyrenic resin.

3. The composition of claim 2, wherein the nitrogen-containing compound is used in an amount between about 0.02 and 2% by weight of the polystyrenic resin.

4. The composition of claim 1, further comprising antimony oxide in an amount which does not exceed about 7% by weight of the polystyrenic resin.

5. The composition of claim 4, wherein the antimony oxide is used in an amount between about 2 and 5% by weight of the polystrenic resin.

6. The composition of claim 1, wherein the polystyrenic resin comprises homopolystrene or a styrene copolymer containing a major amount of styrene.

7. The composition of claim 6, wherein said styrene copolymer comprises an ABS copolymer, a SAN copolymer or a rubber-modified polystyrene.

8. The composition of claim 1, wherein said fire-retardant agent is acetylene tetrabromide, dibromotetrachloroethane, tetrachloroethane, pentachloroethane, hexacloro- or hexabromobenzene, tetrabromobutane, polyhalobiphenyls, polyhalobiphenylethers, perhalopentacyclododecanes, pentabromomonochlorocyclohexane, a chlorinated paraffin or a mixture thereof.

9. The composition of claim 1, wherein said nitrogen-containing organic compound comprises a secondary or tertiary amine having the formula $N(R_1)(R_2)(R_3)$, wherein $R_1$ is H or an alkyl radical containing from 9 to 18 carbon atoms and $R_2$ and $R_3$, which may or may not be the same, are each an alkyl radical containing from 9 to 18 carbon atoms.

10. The composition of claim 1, wherein said nitrogen-containing organic compound comprises an alkylene-bis-fatty acid amide.

11. A composition according to claim 1, wherein said nitrogen-containing compound is an ammonium compound.

12. The composition of claim 11, wherein said nitrogen-containing organic compound comprises an ammonium compound of the formula

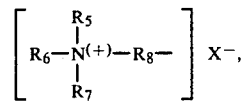

wherein X is Cl, Br or alkylsulfate wherein

1. $R_5$ and $R_7$ are methyl radicals, $R_6$ is an alkyl radical containing at least 9 carbon atoms, $R_8$ is the same as $R_6$ or is a benzyl radical; and X is Cl or Br; or
2. $R_5$ and $R_7$ are methyl radicals, $R_6$ is a dialkyl-phenoxy-ethoxyethyl radical; $R_8$ is a benzyl radical; and X is Cl or Br; or
3. $R_5$ and $R_7$ are methyl radicals, $R_6$ is an alkyl radical containing at least 4 carbon atoms, $R_8$ is H and X is an alkylsulfate group wherein the alkyl radical contains at least 12 carbon atoms.

13. The composition of claim 12, wherein $R_6$ in compound 1. is lauryl or stearyl.

14. The composition of claim 12, wherein $R_6$ in compound 3. is butyl or hexyl and the alkyl radical of the alkylsulfate group is lauryl or stearyl.

15. The composition of claim 1, wherein said nitrogen-containing compound comprises stearyl-dimethyl-benzyl ammonium chloride, distearyl dimethyl ammonium chloride, dilauryl dimethyl ammonium bromide, diisobutylphenoxy-ethoxy-ethyl-dimethylbenzyl ammonium chloride monohydrate, cetylpyridinium bromide, ethylene-bis-stearylamide, distearylamine, trilaurylamine, hexyl-dimethyl-ammonium stearyl-sulfate, or dilauryl-dimethyl-ammonium chloride.

16. A composition according to claim 1, wherein the average cell size of said nitrogen compound containing expanded polystyrenic resin is from about 80 to 100 microns.

17. A composition according to claim 15, wherein said ammonium compound is dilauryl-dimethyl-ammonium or distearyl-dimethyl-ammonium chloride or bromide.

18. A composition according to claim 1, wherein said expanded polystyrene is produced by extruding a polystyrenic resin in the presence of a blowing agent together with said halogenated organic fire retardant agent and said nitrogen-containing compound.

19. A composition according to claim 1, wherein said expanded polystyrene is produced by molding beads of polystyrenic resin containing a blowing agent together with said halogenated organic fire retardant agent and said nitrogen-containing compound.

20. A composition according to claim 18 or 22, wherein said blowing agent comprises at least one compound selected from the group consisting of pentane, dichlorodifluoromethane and trichlorofluoromethane.

* * * * *